United States Patent
Freymann

(10) Patent No.: US 8,740,284 B2
(45) Date of Patent: Jun. 3, 2014

(54) MOTOR VEHICLE COMPRISING AN ACTUATOR FOR OPENING THE SIDE DOOR

(75) Inventor: Raymond Freymann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/618,162

(22) Filed: Sep. 14, 2012

(65) Prior Publication Data

US 2013/0008088 A1    Jan. 10, 2013

Related U.S. Application Data

(63) Continuation of application No. PCT/EP2011/055205, filed on Apr. 4, 2011.

(30) Foreign Application Priority Data

Apr. 8, 2010  (DE) .................. 10 2010 003 755

(51) Int. Cl.
*B60J 5/00*    (2006.01)
(52) U.S. Cl.
USPC ........................................ 296/146.4

(58) Field of Classification Search
USPC ........... 296/146.4, 146.11, 146.2, 146.9, 155, 296/187.12; 49/374; 16/382; 280/730.2
See application file for complete search history.

(56) References Cited

U.S. PATENT DOCUMENTS

| | | | | |
|---|---|---|---|---|
| 4,544,198 | A  * | 10/1985 | Ochiai et al. | 296/155 |
| 6,086,137 | A  * | 7/2000 | Leschke et al. | 296/146.1 |
| 7,168,753 | B1 * | 1/2007 | Faubert et al. | 296/146.12 |
| 7,686,378 | B2 * | 3/2010 | Gisler et al. | 296/146.4 |
| 8,162,379 | B2 * | 4/2012 | Yano | 296/146.4 |
| 2002/0180237 | A1 * | 12/2002 | Rogers et al. | 296/155 |
| 2005/0110300 | A1 * | 5/2005 | Oxley et al. | 296/155 |
| 2010/0185341 | A1 * | 7/2010 | Wilson et al. | 701/1 |
| 2010/0313477 | A1 * | 12/2010 | McKee et al. | 49/28 |
| 2012/0179336 | A1 * | 7/2012 | Oakley | 701/49 |
| 2012/0180391 | A1 * | 7/2012 | McKee et al. | 49/28 |

* cited by examiner

*Primary Examiner* — Kiran B Patel
(74) *Attorney, Agent, or Firm* — Crowell & Moring LLP

(57) ABSTRACT

A motor vehicle has a side door opening that can be closed off by way of a front side door. For opening the front side door from the vehicle interior, the front side door has an actuator on the side facing the vehicle interior for the opening of the front side door. In addition, a second actuator is arranged in the vehicle interior rearwardly of the first actuator, by which second actuator the closed front side door can also be opened. This provides a motor vehicle that permits comfortable entering and exiting of all vehicle occupants.

14 Claims, 2 Drawing Sheets

MOTOR VEHICLE COMPRISING AN ACTUATOR FOR OPENING THE SIDE DOOR

CROSS REFERENCE TO RELATED APPLICATIONS

This application is a continuation of PCT International Application No. PCT/EP2011/055205, filed Apr. 4, 2011, which claims priority under 35 U.S.C. §119 from German Patent Application No. 10 2010 003 755.9, filed Apr. 8, 2010, the entire disclosures of which are herein expressly incorporated by reference.

BACKGROUND AND SUMMARY OF THE INVENTION

The invention relates to a motor vehicle having a side door opening which can be closed off exclusively by a front side door or can be closed off by a front and a rear side door, the front side door being coupled by its front section to the front area and the rear side door being coupled by its rear section to the rear area of the door opening, wherein the closed front side door overlaps the closed rear side door viewed from the exterior side of the vehicle.

From German Patent document DE 600 09 986 T2, a motor vehicle is known in which a front and a rear side door can close off a side door opening in a vehicle body of the motor vehicle, i.e. a so-called "double-leafed hinged door". While the front side door is conventionally coupled by means of its—viewed in the driving direction—front section to the motor vehicle body in the front area of the door opening, the rear door is coupled by means of its rear section to the motor vehicle body in the rear area of the door opening. The front and the rear side door therefore open in a mutually opposite direction.

In the case of two-door motor vehicles, it is further known that the front vehicle seats can be moved forward and the backrest can be tilted forward for permitting a more comfortable entry to the rear vehicle seats. This functionality is generally described by the term "easy entry".

It is an object of the invention to create a motor vehicle that permits a comfortable entering and exiting of all vehicle occupants.

According to the invention, a motor vehicle has a side door opening which, according to a first variant, can be closed off exclusively by way of a front side door. According to a second variant, the side door opening can be closed off by way of a front and a rear side door, the front side door being coupled by way of its front section to the front area and the rear side door being coupled by way of its rear section to the rear area of the door opening, and the closed front side door overlapping the closed rear side door viewed from the exterior side of the vehicle. In this case, the front area of the door opening is generally formed by an A-pillar, while the rear area is generally formed by a C-pillar. The two variants have in common that the front side door has to be opened first in order to permit an entering or exiting of the vehicle occupants. For opening the front side door from the vehicle interior, the front side door has an actuator for opening the front side door. The actuator is on the side facing the vehicle interior in the case of both variants. In addition, a second actuator is arranged in the vehicle interior behind (in the longitudinal direction of the vehicle) the front side door, by which second actuator the closed front side door can also be opened.

When actuated, both actuators open the front side door. According to the invention, the opening of the front side door also already includes an unlocking of the front side door or an opening of the rotary latch of the front side door, which latch holds the side door in the closed position. The actual swinging-open of the side door is not necessarily included in the term "opening of the front side door". The second actuator advantageously mechanically and/or electrically opens up the rotary latch of the front side door, which latch holds the front side door in the closed position.

If the door opening can be closed off by way of a front side door and a rear side door, i.e. a double-leafed hinged door, wherein the closed front side door overlaps the closed rear side door, the front side door first has to be opened at least to a certain extent (such as a gap) before the rear side door can be opened. According to the invention, even this slight swinging-open of the front side door is included in the term "opening the front side door." A door opening that can be closed off by such a front and rear side door is preferably not divided into two partial door openings by a vehicle pillar, such as a B-pillar.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
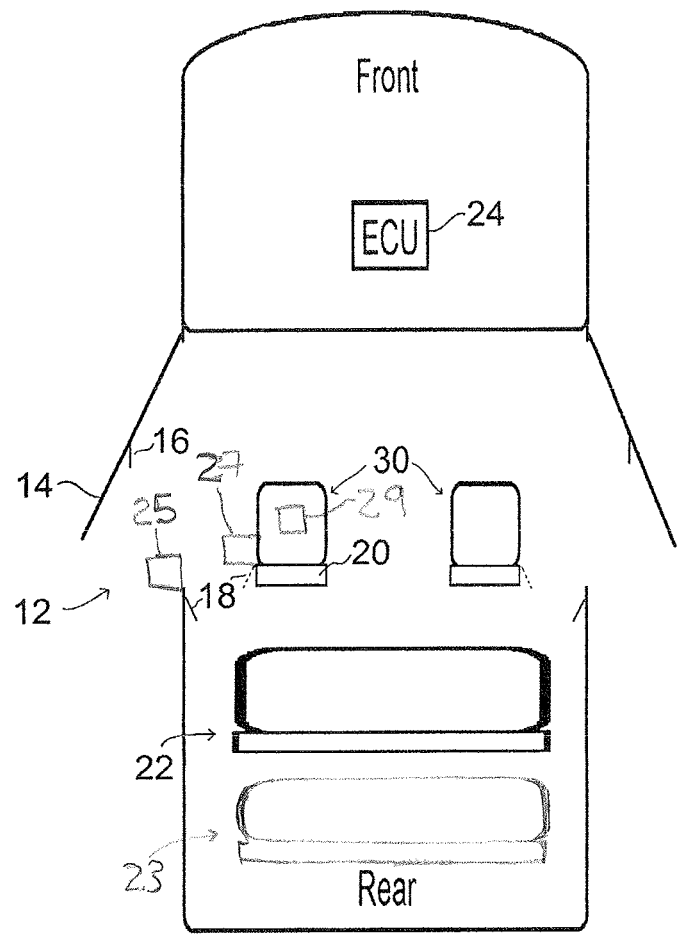
FIG. 1 is a highly schematic diagram of a motor vehicle having first and second actuators for a side door according to an exemplary embodiment of the invention.
Figure 2:
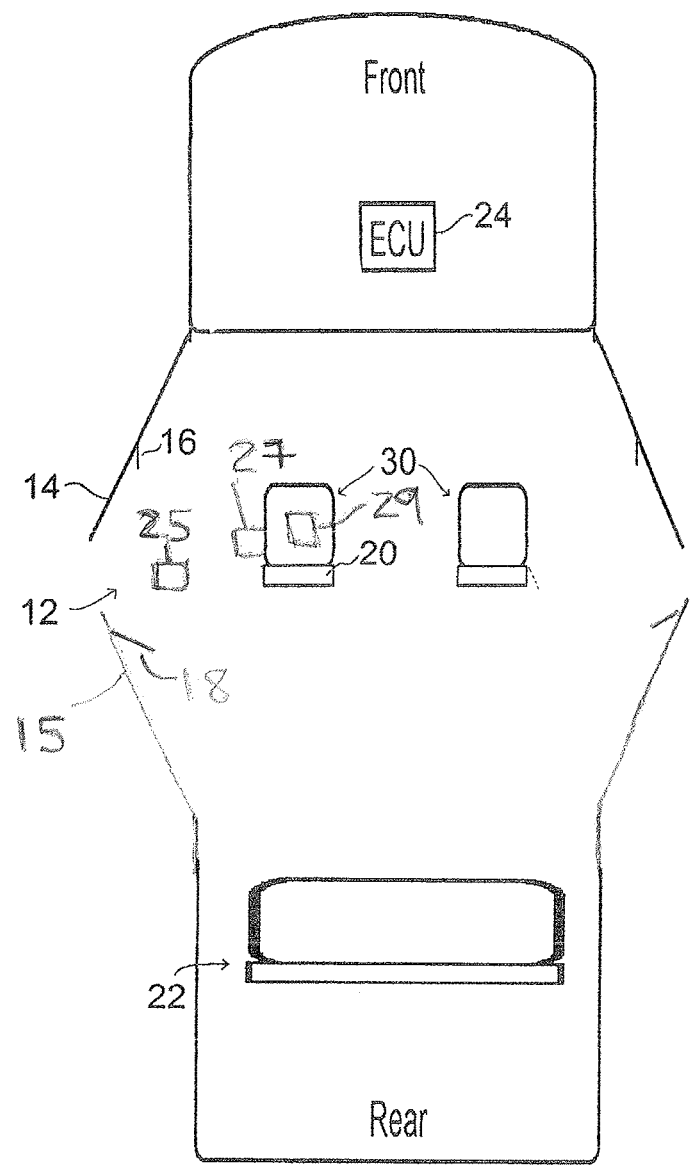
FIG. 2 is a highly schematic diagram of a motor vehicle having front and rear doors and having first and second actuators for a side door according to another exemplary embodiment of the invention.

FIG. 1 is a highly schematic illustration of a vehicle 10 having a front end and a rear end. A side door opening 12 (only the left side door opening being marked with a reference number) may be closed off exclusively via a front side door 14. Alternatively, the side door opening 12 can be closed off via a front and a rear side door (rear door 15 shown in FIG. 2), wherein the front side door is coupled at a front section to the front area of the door opening and the rear side door is coupled at a rear section to the rear area of the door opening, in which case in a closed position, the front side overlaps the rear side door viewed from outside the vehicle.

The front side door 14 includes a first actuator 16 for opening the front side door and/or operating a rotary latch 25. The first actuator 16 is arranged on the front side door on a side facing the interior of the vehicle 10. A second actuator 18 is arranged in the vehicle interior behind or rearwardly of the first actuator 16 within the vehicle interior. The second actuator 18 is also operatively configured for opening the front side door.

As shown in the figure, the second actuator 18 may be arranged rearwardly of the front side door 14 on a side panel of the vehicle or, alternatively, may be arranged on a backrest 20 of a front vehicle seat (the second actuator on the backrest being illustrated by dashed lines).

The arrangement according to the invention mainly improves comfort when rear seat 22, 23 vehicle occupants exit the vehicle. For passengers in the front seats 30 of the motor vehicle, the first actuator 16 on the interior side of the front side door is normally easily accessible. In contrast, the rear seat occupants would have to lean very far forward or would even have to climb forward in order to be able to use the first actuator. However, the second actuator 18, located behind the front side door 14, is clearly more easily reachable for the rear seat occupants. The second actuator is preferably arranged in the vehicle interior such that it is easily accessible for the vehicle occupants of a second or third row of seats. In this manner, the rear seat passengers can also relatively comfortably open the front side door, so that they can readily exit independently of any front seat occupants.

The second actuator is advantageously arranged in a side paneling of the vehicle interior behind the front side door or on a backrest of a front vehicle seat. At the present time, actuators for an easy entry function are already frequently arranged laterally on a seatback or backrest 20 of a vehicle seat. On the one hand, a corresponding actuator is easily accessible here for the vehicle occupants sitting behind this vehicle seat; on the other hand, accidental faulty operations are virtually excluded.

If a motor vehicle has a door opening on both sides, a second actuator for the left as well as for the right front side door is, in each case, ideally arranged behind the respective front side door. In this case, the second actuator for the left front side door is preferably arranged in the left half of the vehicle interior, and the second actuator for the right front side door is arranged in the right half of the vehicle interior. The second actuators are, for example, in each case arranged on the side of the backrest facing the exterior side of the vehicle. The side paneling of the vehicle interior behind the front side doors is also very suitable for mounting the second actuator. For example, the second actuator for the left front side door is arranged in the left side paneling, and the second actuator for the right front side door is arranged in the right side paneling.

According to a further advantageous development, the second actuator is connected with an electric control unit 24, so that, when the second actuator is actuated, the front side door will be opened only when at least one defined condition of the vehicle is present. Such a defined condition may, for example, be the stoppage of the motor vehicle, so that an opening of the front side door by way of the second actuator will not be possible, while driving. This simultaneously protects against unauthorized use and provides a child protection feature.

When the second actuator is actuated, preferably at least one unlocking device and/or at least one adjusting mechanism 27 of a front vehicle seat will simultaneously be activated. The mere opening of the front side door does not automatically already permit a comfortable exiting of the rear seat passengers. Often the exit will still be obstructed by the front vehicle seat. This can be avoided in that, when the second actuator is actuated, not only the front side door is opened but simultaneously the front vehicle seat, for example, moves to the front and the backrest tilts to the front, as takes place in the case of an "easy entry" functionality. However, advantageously, no passenger should be sitting in the front seat.

This is preferably taken into account by the electric control. Thus, the unlocking device and/or the adjusting mechanism of the front vehicle seat will be activated only if it is ensured by way of a seat occupancy detector 29 that no vehicle occupant is sitting in the front vehicle seat. As an alternative, the entire second actuator may even be deactivated if the front seat is occupied, because in this case, even the exclusive opening of the front side door does not permit a comfortable exit.

The motor vehicle advantageously is a convertible or a coupe. Convertibles and coupes are typical motor vehicles where the side door openings are each closed off exclusively by way of a front side door. However, they nevertheless usually have a rear row of seats. According to the invention, the vehicle occupants in this rear row of seats can open a front side door by way of a second actuator at any time and, if necessary, can displace the front seat out of the exit area, so that they can independently exit in a comfortable manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    a side door opening;
    a front side door operatively configured to exclusively close-off the side door opening in the region adjacent to a first seat row;
    a first actuator operable by a first seat row occupant and operatively configured for opening the front side door, the first actuator being arranged on a side of the front side door facing an interior of the vehicle in the region adjacent to a first seat row;
    a second actuator operatively configured for opening the front side door when closed, the second actuator being located rearwardly of the first actuator relative to a front end of the motor vehicle in an ergonomically accessible location reachable by a rear seat occupant of a seat row located behind the first seat row.

2. The motor vehicle according to claim 1, wherein the second actuator is operatively arranged in the vehicle interior at an ergonomically accessible location reachable by the rear seat occupant in at least one of a second seat row and a third seat row.

3. The motor vehicle according to claim 2, wherein the second actuator is arranged in a side panel of the vehicle interior, the side panel being rearward of the front side door.

4. The motor vehicle according to claim 2, wherein the second actuator is arranged on a backrest of a front vehicle seat of the motor vehicle.

5. The motor vehicle according to claim 1, further comprising an electronic control unit coupled with the second actuator, the electronic control unit being operatively configured for allowing opening of the front side door via the second actuator only when a defined condition of the vehicle is present.

6. The motor vehicle according to claim 4, further comprising an electronic control unit coupled with the second actuator, the electronic control unit being operatively configured for allowing opening of the front side door via the second actuator only when a defined condition of the vehicle is present.

7. The motor vehicle according to claim 5, wherein the defined condition of the vehicle is that the vehicle is stationary.

8. The motor vehicle according to claim 6, wherein the defined condition of the vehicle is that the vehicle is stationary.

9. The motor vehicle according to claim 1, wherein the second actuator for opening the front side door is operatively configured to at least one of mechanically and electrically open a rotary latch that holds the front side door in the closed position.

10. The motor vehicle according to claim 1, further comprising:
    at least one of an unlocking device and an adjusting mechanism of a front vehicle seat of the front seat row, and wherein the second actuator is operatively configured to simultaneously activate the at least one of the unlocking device and the adjusting mechanism of the front vehicle seat when actuated.

11. The motor vehicle according to claim 10, further comprising:
a seat occupancy detector, and
wherein activation of the at least one of the unlocking device and the adjusting mechanism of the front vehicle seat occurs only when the seat occupancy detector detects that no occupant is in the front vehicle seat.

12. The motor vehicle according to claim 10, wherein when the second actuator is actuated, at least one of the front vehicle seat is adjusted forward and a backrest of the front vehicle seat is tilted forward.

13. The motor vehicle according to claim 11, wherein when the second actuator is actuated, at least one of the front vehicle seat is adjusted forward and a backrest of the front vehicle seat is tilted forward.

14. The motor vehicle according to claim 1, wherein the motor vehicle is one of a convertible vehicle and a coupe vehicle.

* * * * *